United States Patent
Kawaguchi et al.

(10) Patent No.: US 6,947,244 B2
(45) Date of Patent: Sep. 20, 2005

(54) SERVO PATTERN WRITING METHOD AND APPARATUS THEREOF

(75) Inventors: Hiroshi Kawaguchi, Yokohama (JP); Shizuo Yamazaki, Odawara (JP); Makoto Horisaki, Odawara (JP); Katsumi Watanabe, Odawara (JP); Kenji Tomida, Matsuda (JP); Youichi Kusagaya, Mishima (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 263 days.

(21) Appl. No.: 10/306,103

(22) Filed: Nov. 27, 2002

(65) Prior Publication Data
US 2003/0142436 A1 Jul. 31, 2003

(30) Foreign Application Priority Data
Nov. 29, 2001 (JP) ........................... 2001-363561

(51) Int. Cl.⁷ .............................................. G11B 21/02
(52) U.S. Cl. .......................................................... 360/75
(58) Field of Search ........................................ 360/69, 75

(56) References Cited

U.S. PATENT DOCUMENTS 5,975,839 A * 11/1999 Ashby ..................... 414/798.1
6,421,199 B1 * 7/2002 McKenzie et al. ........ 360/77.04
6,655,244 B2 * 12/2003 Shiraishi et al. ............. 82/1.11

FOREIGN PATENT DOCUMENTS

| JP | 09-320002 | 12/1997 |
| JP | 11-185445 | 7/1999 |
| JP | 2000-268533 | 9/2000 |
| JP | 2001-101741 | 4/2001 |

* cited by examiner

Primary Examiner—David Hudspeth
Assistant Examiner—K. Wong
(74) Attorney, Agent, or Firm—Townsend and Townsend and Crew LLP

(57) ABSTRACT

The center of rotation of a disk medium 1 when servo information is written thereto coincides as accurately as possible with its center of rotation in the drive into which the disk medium 1 is assembled.

The magnetic disk medium 1 is fixed to a spindle hub 4. A centering pin 8a of a push-aside mechanism 9 pushes aside the magnetic disk medium 1 with respect to the center of the spindle hub 4 until the disk-to-hub gap is moved to one side. Then, with a centering pin 8b of a come-back mechanism 10 placed in the same line intersecting with the center of the spindle, the magnetic disk medium 1 is pushed back to the opposite side.

19 Claims, 3 Drawing Sheets general controller (a) spring control method (b) air attraction method (c) pressing method (a) column centering pin (b) flat board centering pin (c) column+flat board centering pin

SERVO PATTERN WRITING METHOD AND APPARATUS THEREOF

FIELD OF THE INVENTION

The present invention relates to a servo pattern writing apparatus/method for writing a servo pattern to a medium such as a magnetic disk.

BACKGROUND OF THE INVENTION

In the prior art, writing servo information onto a disk medium for positioning a head at an aimed track of a disk medium (Servo Track Writing: STW) is performed after the disk medium has been incorporated into the magnetic disk drive. In this regard, there is a problem that a spindle and a head actuator may oscillate in the STW operation, resulting in meandering servo tracks written due to the superimposed radial component of the vibrations. Accordingly, a method for writing servo information with a smaller error is disclosed in Japanese Patent Laid-open No. 9-320002. In this method, before a magnetic disk medium is assembled into a magnetic disk drive, servo information is written onto the magnetic disk medium in the state of a single plate by using a high precision spindle motor and a head actuator which is held so as to suppress its oscillation. The magnetic medium is assembled to a spindle of the magnetic disk drive after the STW operation is done.

In addition, methods for fixing a magnetic disk medium to a spindle hub with a suppressed eccentric error are disclosed in Japanese Patent Laid-open Nos. 1999-185445, 2000-268533 and 2001-10174.

In the case of the method where servo information is written onto a disk medium before the magnetic disk is assembled to a spindle of a magnetic disk drive, the disk's center of rotation in the disk drive must coincide with the center of the written tracks as accurately as possible.

To fix the disk medium with no eccentricity from the center of rotation of the spindle hub by using the method disclosed in Japanese Patent Laid-open No. 1997-320002, it is necessary to make the outside diameter of the spacer identical to the inside diameter of the disk medium. However, this is not feasible due to the high machining precision required for the spacer and disk medium. Even if the outside diameter of the spacer can be made equal to the inner diameter of the disk medium, another problem occurs. When pulling out the spacer, the disk medium may be shifted since the medium was in contact with the spacer.

In the method disclosed in Japanese Patent Laid-open No. 11-185445, there is a problem that since each positioning mechanism moves radially in the case of multi-disk medium, an attempt to narrow the space between disk media in a multi-disk drive is limited.

In the method disclosed in Japanese Patent Laid-open No. 2000-268533, since the respective actuators are bumped against disk media at different timings, positioning requires increased time. In addition, this method is still not free from the problem of deflecting the hub.

In the method disclosed in Japanese Patent Laid-open No. 2001-101741, if the air jet holes of the spindle hub, for each magnetic disk medium, are different in altitude, the magnetic disk medium waves vertically. In addition, if the air jet holes have different bore diameters, the magnetic disk medium is positioned eccentrically around the spindle hub. To prevent these situations, the air jet holes for each magnetic disk medium must be uniform in altitude and bore diameter but this is not feasible in view of the machining precision required to manufacture such a spindle hub.

SUMMARY OF THE INVENTION

According to one aspect of the present invention, there is provided a servo writing method/apparatus characterized in that when servo information is to be written onto a disk medium fixed around a spindle hub, its center of rotation can quickly be located to the center of a spindle hub so that the center can coincide with the center of rotation in the drive to which the disk medium will be assembled.

According to another aspect of the present invention, there is provided a servo pattern writing method/apparatus characterized in that a great number of disk media can be stacked around a spindle hub and their center of rotation can be located to the center of the spindle hub regardless of how narrow the disk-to-disk space is.

According to yet another aspect of the present invention, there is provided a serve pattern writing method/apparatus characterized in that the center of rotation of disk media can be located to the center of the spindle hub without deflecting the hub.

According to the present invention, plural magnetic disk media are all pushed to one side of a spindle hub and then the plural magnetic disk media are all moved back by a certain amount of distance toward the opposite side. The amounts of eccentricity of the plural magnetic disk media with respect to the center of the spindle hub can respectively be suppressed to below a certain level by performing this centering procedure only once.

Figure 1:
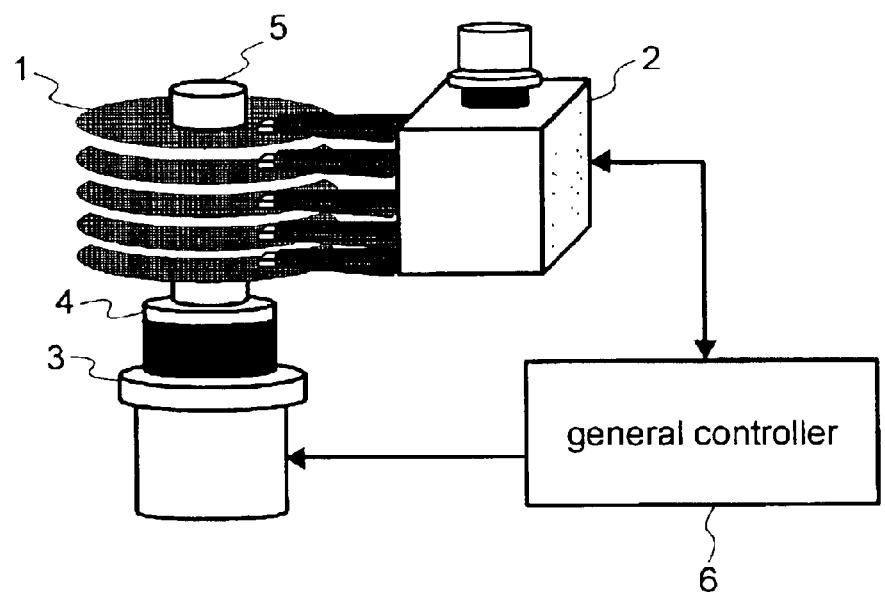
FIG. 1 is a view showing a servo pattern writer.

Reference numeral 1 designates a magnetic disk medium; 2 denotes a head actuator mechanism; 3 is a spindle motor; 4 is a spindle hub; 5 is a clamp; 6 is a general controller; 7 is a spacer; 8, 8a and 8b are centering pins; 9 is a push-aside mechanism; 10 is a come-back mechanism; 11 is a centering mechanism; 12 is a spring; 13 is an air attraction element; 14 is an elastic body; and 15 is a holding structure.

DESCRIPTION OF THE PREFERRED EMBODIMENTS

Embodiments of servo pattern writing apparatus/methods for magnetic recording disk media according to the present invention will hereinafter be described with reference to the drawings. FIG. 1 shows an embodiment of a servo pattern writing apparatus by which servo information is written onto magnetic disk media before the disks are incorporated by using a centering mechanism.

As shown in FIG. 1, this embodied servo pattern writing apparatus is composed of: a head actuator mechanism 2 which drives heads to read/write a servo pattern from/to a plurality of magnetic disk media 1; a spindle motor 3 which is used to rotate the magnetic disk media 1; a spindle hub 4 which is fixed to the spindle motor 3 and has the magnetic disk media 1 and spacers 7 fixed thereto in such a manner that they can be detached; a clamp 5 which fixes the magnetic disk media 1 and spacers 7 to the spindle hub 4 (see FIG. 2); and a general controller 6 which generates servo patterns to be written to the magnetic disk media 1 and controls the spindle motor 3. The magnetic disk media 1 are fixed to the spindle hub 4 in such a manner that the spindle hub 4 is passed through the central hole of each magnetic disk medium 1 and the spacer 7 is sandwiched between the magnetic disk media 1.

After a servo pattern is written to the magnetic disk media 1 by using such a servo pattern writer as this embodiment, the magnetic disk media 1 are assembled into a magnetic disk drive. As a result of assembling a magnetic disk medium 1 to the spindle hub of the magnetic disk drive, the inner diameter of the magnetic disk medium 1 may be brought into contact with the outside diameter of the spindle hub at any place of the circumference. In this case, if the spindle hub of the magnetic disk drive is deformed due to temperature rise/fall or physical shock, a force occurs at the place where the magnetic disk medium 1 is contact with the spindle hub, which may deform the magnetic disk medium 1 in a specific direction, resulting in deteriorated positioning accuracy.

Accordingly, when the magnetic disk media 1 are assembled to the spindle hub of the magnetic disk drive, the center of the magnetic disk media 1 is aligned to the center of rotation of the spindle hub before disk clamp is done. Therefore, in order to suppress the eccentricity of the magnetic disk media 1 in the magnetic disk drive, it is of critical importance to center the magnetic disk media 1 when a servo pattern is written by the servo pattern writer.

Figure 2:
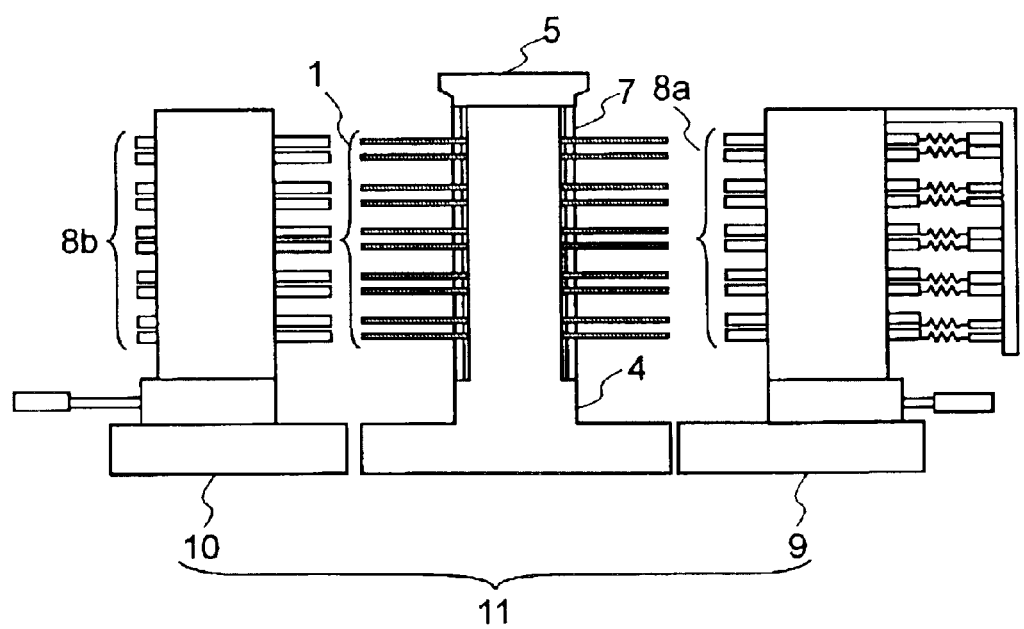
FIG. 2 is a view showing an embodiment of a centering mechanism according to the present invention.

Shown in FIG. 2 is an embodiment of a centering mechanism according to the present invention. The spacers 7 and magnetic disk media 1 are stacked alternately around the spindle hub 4 provided with the clamp 5 at the top. The magnetic disk media 1 and spacers 7 are fixed to the spindle hub 4 by this clamp 5. The centering mechanism 11 comprises a push-aside mechanism (a first mechanism) 9 provided with as many centering pins 8a as the stacked magnetic disk media 1 and a come-back mechanism (a second mechanism) 10 provided with the same number of centering pins 8b. The centering pins 8a of the push-aside mechanism 9 move the magnetic disk media 1 in a radial direction by pushing their outer edges. The come-back mechanism 10 is placed so as to form an angle of 180 degrees with the push-aside mechanism 9 around the spindle hub 4, that is, the come-back mechanism 10 and the push-aside mechanism 9 are placed in opposite directions when viewed from the spindle hub 4. The centering pins 8b of the come-back mechanism 10 also move the magnetic disk media 1 in a radial direction by pushing their outer edges. Although the push-aside mechanism 9 and the come-back mechanism 10 are controlled by the general controller 6, it is also possible to use another controller (a second controller) to control them.

By pushing back the plural magnetic disk media 1 by a certain amount of distance simultaneously using the come-back mechanism 10 after the plural magnetic disk media 1 are fully pushed aside simultaneously using the push-aside mechanism 9, the amount of eccentricity of each magnetic disk medium 1 stacked to the spindle hub 4 can be suppressed to below a certain value. Practically, if the amount of movement of the come-back mechanism 10 to push back the magnetic disk media 1 is a half of the average disk-to-hub gap, the difference between the average inner diameter of the magnetic disk media 1 and the outside diameter of the spindle hub 4, the amount of eccentricity of the magnetic disk media 1 can be suppressed to a fourth or less of the tolerance of the inner diameter of the magnetic disk media 1.

For example, if the outside diameter of the spindle hub is 19.98 mm and the inner diameter of the magnetic disk media 1 is 20.025 mm with a tolerance of 50 $\mu$m ($\pm$25 $\mu$m), the disk-to-hub gap is:

$$[(20.025-0.025)-19.98]-[(20.025+0.025)-19.98]\text{mm}$$

That is, the disk-to-hub gap varies from 20 to 70 $\mu$m. In this case, if the come-back mechanism 10 is moved to push back the magnetic disk media 1 by 22.5 $\mu$m, a half of the average inner diameter 20.025 mm of the magnetic disk media 1 minus the outside diameter 19.98 mm of the spindle hub 4, the maximum eccentricity is 12.5 $\mu$m as shown in Table 1, that is, the amount of eccentricity can be suppressed to a fourth or less of the tolerance 50 $\mu$m of the inner diameter of the magnetic disk media 1. Here, the amount of eccentricity is a value indicating the mount of correction required to eliminate the eccentricity. After push-aside is fully done, the amount of eccentricity is (disk-to-hub gap/2). Table 1 shows the results of calculating the amounts of eccentricity.

The centering operation may be done in such a manner that the inner diameters of the magnetic disk media 1 are measured and the come-back mechanism 10 is moved by a half of the average inner diameter of the magnetic disk media. In this case, the amount of eccentricity can be suppressed to a fourth or less of the inner diameter's variation among the magnetic disk media 1. Further, this may be arranged in such a manner that the magnetic disk media 1 are sorted into ranks by inner diameter, magnetic disk media 1 of each rank are fixed to the spindle hub 4 at a time and the come-back mechanism 10 is moved by a half of the average inner diameter of the rank's magnetic disk media 1. In this case, the amount of eccentricity can be suppressed to a fourth or less of the inner diameter's variation within that rank.

The inner diameter (average) of the magnetic disk media 1 may be either entered by the operator to the push-aside mechanism 9, the come-back mechanism 10 and the controller (the general controller 6 or the second controller) through an input device (not shown in the figure) or measured by sensors placed in the positioning mechanism after they are set to the spindle hub 4. The outside diameter of the spindle hub 4 can be entered and stored to the controller previously because the value is specific to the apparatus. Finally, the amount of movement of the push-aside mechanism 9 and the amount of movement of the come-back mechanism 10 are determined as mentioned above.

The amount of movement of the magnetic disk media 1 by the come-back mechanism 10 can be controlled based on the measurement of a displacement sensor attached to the centering pin 8a, which moves according to the movement of the magnetic disk media 1, of the push-aside mechanism 9. Likewise, the amount of movement of the magnetic disk media 1 by the come-back mechanism 10 can also be controlled based on the measurement of a replacement sensor attached to the centering pin 8b of the come-back mechanism 10.

Further, the amount of movement of the magnetic disk media 1 by the come-back mechanism 10 can also be controlled based on the comparison between the measurement of a displacement sensor attached to the centering pin 8b of the come-back mechanism 10 and the measurement of a displacement sensor attached to the centering pin 8a of the push-aside mechanism 9. In addition, the configuration may be designed so as to either move all centering pins 8 equally or move each centering pin 8 independently while the push-aside or come-back operation is performed.

In the former case where all centering pins 8a and 8b of the push-aside mechanism 9 and come-back mechanism 10 are respectively moved equally, since each mechanism requires only one drive system, the space between adjacent centering pins 8 and therefore the space between adjacent stacked magnetic disk media 1 can be designed freely.

Figure 3:
FIGS. 3(a) to 3(c) are views showing a control method for a push-aside mechanism and a come-back mechanism according to the present invention.
Figure 3:
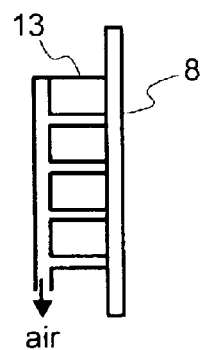
Figure 3:
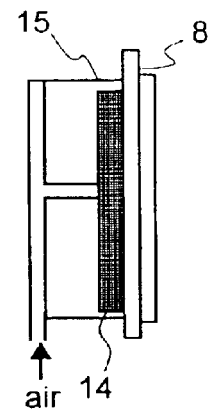

Shown in FIGS. 3(a) to 3(c) are embodiments of methods for controlling the push-aside force by the push-aside mechanism 9 and the push-back force by the come-back mechanism 10.

In FIG. 3(a), a spring 12 of a certain spring constant is attached to an end face of the centering pin 8. In this method, the push-aside force or push-back force is controlled by the amount of elongation/contraction of the spring 12. The push-aside or push-back force is dependent on the spring constant, the amount of elongation/contraction and the minimum spring force which are determined by taking into consideration such factors as the force required to move each of the stacked magnetic disk media 1 and the amount of movement of the magnetic disk media which must be achieved by the push-aside mechanism 9 or come-back mechanism 10.

In FIG. 3(b), a side surface of the centering pin 8 is attracted to an air attraction element 13. In this method, the attracting air pressure is controlled to change the friction between the air attraction element 13 and the centering pin 8 and therefore change the push-aside or push-back force. The push-aside or push-back force is dependent on the air pressure which is determined by taking into account the force required to move each of the stacked magnetic disk media 1 and other factors.

In FIG. 3(a), an elastic body 14 is pressed to a side surface of the centering pin 8 on a holding structure 15 by the supplied air to thereby allow the centering pin 8 to be held due to the friction between the elastic body and the centering pin 8. The push-aside or push-back force is dependent on the air pressure which is determined by taking into consideration such factors as the force required to move each of the stacked magnetic disk media 1.

In either method, slipping occurs when the magnetic disk media 1 are pushed aside to the spindle hub 4. This is because each of the magnetic disk media 1 stacked through the spindle hub 4 has a different inner/outside diameter and therefore requires a different amount of movement of that centering pin 8 until the magnetic disk medium 1 is fully pushed aside. Assume that one magnetic disk medium 1 has a relatively smaller inner diameter and a relatively larger outside diameter and another magnetic disk medium 1 has a relatively larger inner diameter and a relatively smaller outside diameter. In this case, the former one is fully pushed aside earlier than the latter one. The centering pin 8 for the former one continues to slip until the latter one is fully pushed aside.

This means that any other method can be used to hold the centering pins 8 of the push-aside mechanism 9 and come-back mechanism 10 and control the push-aside and push-back forces if the method allows the centering pins 8 to slip when the magnetic disk media 1 are pushed aside. Further, different methods, shown in FIGS. 3(a) to 3(c), can be used for the push-aside mechanism 9 and the come-back mechanism 10 respectively.

Figure 4:
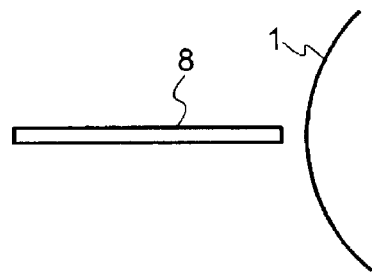
FIGS. 4(a) to 4(c) are views showing embodiments of a centering pin according to the present invention.
Figure 4:
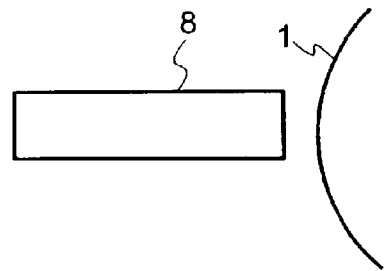
Figure 4:
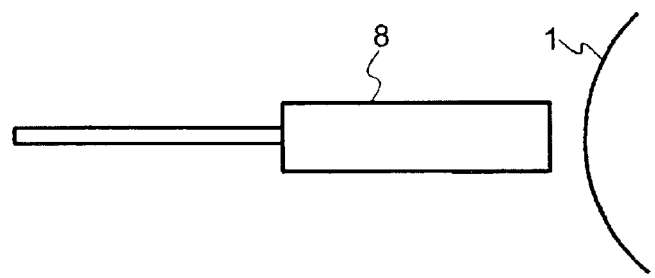

FIGS. 4(a) to 4(c) show the shapes of centering pins embodied according to the present invention. The centering pin in FIG. 4(a) is a column. That in FIG. 4(b) is a flat board. That in FIG. 4(c) is a column combined with a flat board. Either shape is allowed if the centering pins 8 can touch and push the respective outer edges of all magnetic disk media 1 stacked alternately with the spacers 7 through the spindle hub 4.

However, the centering pins 8 must be configured in such a manner that they move toward the center of the spindle hub 4. Otherwise, centering must be done in two directions perpendicular to each other. Since the centering mechanism of the present invention is configured so as to move the centering pins 8 toward the center of the spindle hub 4, centering of the magnetic disk media 1 can be done surely in all directions by moving the media 1 forth and back only once.

Accordingly, if the top end of a centering pin 8 is shaped like a flat board as shown in FIG. 4(b) or 4(c), centering of the magnetic disk medium 1 can be done surely in two directions perpendicular to each other since the magnetic disk medium can be pushed toward the center of the spindle hub 4 even if the centering pin 8 is not accurately directed toward the center of the spindle hub 4.

The configuration in FIGS. 4(a) to 4(c) can also be modified in such a manner that the centering pins 8 of the push-aside mechanism 9 and come-back mechanism 10 are rotated by 90 degrees to make those of the push-aside mechanism 9 parallel with those of the come-back mechanism 10. In this configuration, each centering pin 8 is moved sideward to push the magnetic disk medium 1 by its side surface. Similar to the configurations in FIGS. 4(b) and 4(c), this configuration allows the centering pin 8 to surely push the magnetic disk medium 1 to the center of the spindle hub 4.

Figure 5:
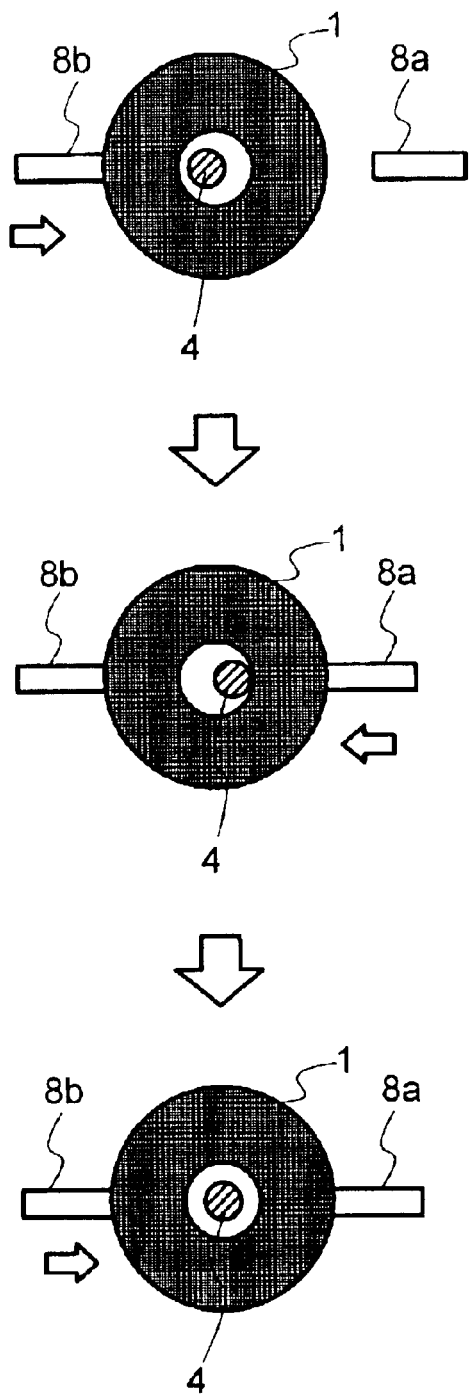
FIG. 5 is a view showing an implementation of a centering procedure according to the present invention.

Shown in FIG. 5 is a centering procedure in an embodiment of the present invention. First, all centering pins 8b of the come-back mechanism 10 are respectively pushed against all magnetic disk media 1 which differ in the inner diameter and outside diameter. Then, with a push-aside force larger than the push-back force, the centering pins 8a of the push-aside mechanism 9 are moved to push aside the magnetic disk media 1. In this step, the magnetic disk media 1 are kept sandwiched between the centering pins 8a of the push-aside mechanism 9 and the centering pins 8b of the come-back mechanism 10. Then with a push-back force made larger than the push-aside force, the magnetic disk media 1 are moved back by the same distance and therefore the eccentricity of any magnetic disk medium 1 stacked through the spindle hub 4 can be suppressed to below a certain value.

For example, assume that the spring-used control method as shown in FIG. 3(a) is employed in the push-aside mechanism 9 and the friction-used control method pushing an elastic body 14 made of rubber or the like to a side surface of each centering pin 8 by supplied air along a holding structure 15 as shown in FIG. 3(b) is employed in the come-back mechanism. In this configuration, when the centering pins 8b of the come-back mechanism 10 are respectively pushed against all magnetic disk media having different inner diameters and outside diameters in the first step, the air pressure supplied to the holding structure is preferably 0.5 kgf/cm$^2$ (holding force: 50 gf) if the coefficient of friction between the elastic body 14 and the centering pin 8b is 0.1. Then when the magnetic disk media 1 are pushed aside by the centering pins 8a of the push-aside mechanism 9, the spring force is set to, for example, 150 gf larger than the holding force by the centering pin 8b of the come-back mechanism 10 so that the magnetic disk media 1 are pushed aside. Then when the magnetic disk media 1 are moved back by the come-back mechanism 10 over a certain amount of distance, the air pressure supplied to the holding structure 15 is set to, for example, 2.0 kgf/cm$^2$ (holding force: 200 gf) to make the push-back force larger than the push-aside force. In this step, it may be also preferable to set the spring force of the push-aside mechanism 9 to a lower level (0~100 gf) enough smaller than the push-back force of the come-back mechanism 10.

In this centering procedure, when the magnetic disk media 1 are pushed aside, the magnetic disk media must be kept sandwiched between the centering pins 8a of the push-aside mechanism 9 and the centering pins 8b of the come-back mechanism 10 so that the magnetic disk media 1 are fully pushed aside even if their inner diameters have a variation. Therefore, the centering pins 8b of the come-back mechanism 10 should be pushed against the magnetic disk media 1 with an enough small push-back force not to move the magnetic disk media 1. Thus, after the magnetic disk-media 1 are pushed aside by the centering pins 8a of the push-aside mechanism 9, the disk media 1 can be moved by a desired amount of distance by pushing the centering pins 8b with a force greater than the push-aside force, even if a plural disk media 1 are set and have different inner diameters for each medium.

This procedure may also be arranged in such a manner that after the magnetic disk media 1 are pushed aside by the push-aside mechanism 9 and before the pushed-aside disk media 1 are pushed by the centering pins 8b of the come-back mechanism 10, the push-aside force by the push-aside mechanism 9 is changed to an enough lower level and the magnetic disk media 1 are clamped. For example, assume that the spring-used control method as shown in FIG. 3(a) is employed in the push-aside mechanism 9 and the friction-used control method pushing an elastic body 14 made of rubber or the like to a side surface of each centering pin 8 by supplied air along a holding structure 15 as shown in FIG. 3(b) is employed in the come-back mechanism. In this case, when the magnetic disk media 1 are pushed aside by the centering pins 8a of the push-aside mechanism 9, the spring force (push-aside force) may be set to 0 gf after the magnetic disk media 1 are pushed aside with a spring force of 60 gf.

Then the magnetic disk media 1 are fixed by clamping and all centering pins 8b of the come-back mechanism 10 are respectively pushed against all magnetic disk media 1. In this case, the air pressure supplied to the holding structure 15 may be set to 0.0 kgf/cm$^2$ (holding force: 0 gf) if the coefficient of friction between the elastic body 14 and the centering pin 8b is 0.1. Then, to move back, the magnetic disk media 1 by the come-back mechanism 10 over a certain amount of distance after the clamp is released, the air pressure supplied to the holding structure 15 is set to 2.0 kgf/cm$^2$ (holding force: 200 gf) so that the magnetic disk media 1 can be moved. In this case, since no spring force (push-aside force) is applied in the opposite direction, the magnetic disk media 1 can be pushed back with a minimum force. When pushing the centering pins 8b of the come-back mechanism 10 to the magnetic disk media 1, due to no push-aside force applied, steady centering operation is possible without deflecting the spindle hub 4.

If all the magnetic disk media 1 are fully and enough strongly pushed aside by the centering pins 8b of the push-aside mechanism 9 regardless of their inner diameter and outside diameter variations, centering of the magnetic disk media 1 will be achieved not only in the pushed direction but also in the direction perpendicular to the pushed direction after the magnetic disk media 1 are pushed back by the come-back mechanism 10. To raise the accuracy of centering in the direction perpendicular to the pushed direction, push-aside may be repeated several times by the centering pins 8b of the come-back mechanism 10 and by the centering pins 8a of the push-aside mechanism 9.

After centering is complete, the magnetic disk media 1 are fixed by the clamp 5. To prevent the magnetic disk media 1 from shifting in the directions in which the magnetic disk media 1 are sandwiched by the centering pins 8 when the magnetic disk media 1 are fixed, the magnetic disk media 1 should be kept sandwiched at their ends between the centering pins 8b of the come-back mechanism 10 and the centering pins 8a of the push-aside mechanism 9 after they are pushed back by a certain amount of distance by the centering pins 8b of the come-back mechanism 10. If the fixing method does not cause the magnetic disk media 1 to shift, the centering pins 8b of the come-back mechanism 10 and the centering pins 8a of the push-aside mechanism 9 may be released from the magnetic disk media 1 before they are fixed. For example, the air clamp method does not shift the magnetic disk media 1 since the clamp 5 acts only vertically by air attraction.

The present invention provides a serve pattern writing apparatus capable of writing a servo pattern onto plural magnetic disk media with a suppressed amount of eccentricity before the plural magnetic disk media are assembled into a drive. The servo pattern is written after the plural disk media are centered around the spindle hub of the servo pattern writing apparatus. This centering is achieved only by pushing aside the magnetic disk media to the spindle hub and then pushing back them by a certain amount of distance. The centering pins of the push-aside mechanism are moved uniformly rather than moved individually. Also the centering pins of the come-back mechanism operate equally. Thus the apparatus can be constructed at low cost, can be operated easily and can perform centering quickly.

What is claimed is:

1. A servo pattern writing method, comprising the steps of:

fixing a recording medium around a spindle hub;

pushing aside fully the recording medium with respect to the center of the spindle hub in one direction;

in a direction opposite to said direction, moving the recording medium by a half of the difference between the outside diameter of the spindle hub and the average inner diameter of the recording medium to thereby center the same; and writing a servo pattern onto the recording medium.

2. A servo pattern writing method, comprising the steps of:

fixing plural recording media around a spindle hub;

applying a load to a push-aside mechanism to push the plural recording media fully against the center of the spindle hub in one direction;

in a direction opposite to said direction, moving a come-back mechanism until the come-back mechanism reaches each of the plural recording media;

applying a load, larger than the load applied from the push-aside mechanism, to the come-back mechanism, moving the plural media by a half of the difference between the outside diameter of the spindle hub and the average inner diameter of the plural recording media; and writing a servo pattern onto the plural recording media.

3. A servo pattern writing method, comprising the steps of:

fixing plural recording media around a spindle hub by means of a clamp;

applying a load to a push-aside mechanism to push aside fully the plural recording media against the center of the spindle hub in one direction;

in a direction opposite to said direction, moving a come-back mechanism until the come-back mechanism reaches each of the plural recording media;

releasing the clamp; applying a load to the come-back mechanism to move the plural recording media by a half of the difference between the outside diameter of the spindle hub and the average inner diameter of the plural recording media;

fixing the plural recording media again around the spindle hub by means of the clamp; and writing a servo pattern onto the plural recording media.

4. The servo pattern writing method according to one of claims 1, 2, and 3, further comprising the steps of:

entering the inner diameter of the plural recording media after the recording medium is fixed around the spindle hub; and based on this inner diameter, determining the amount of distance by which the plural recording medium is to be pushed back.

5. A servo pattern writing apparatus comprising:

a spindle hub around which a recording medium is fixed;

a spindle motor having the spindle hub fixed thereto and rotating the spindle hub;

a head for reading and writing a servo pattern from and to the recording medium;

a head actuator mechanism for driving the head;

a first mechanism which moves the recording medium fixed around the spindle hub;

a second mechanism which is placed opposite to the first mechanism around the spindle hub and moves the recording medium in a direction opposite to the moving direction of the first mechanism; and a controller which drives the first mechanism to push aside fully the recording medium against the spindle hub in one direction; drives the second mechanism to move the recording medium by a half of the difference between the outside diameter of the spindle hub and the average inner diameter of the recording medium in a direction opposite to the moving direction of the first mechanism; generates the servo pattern; and drives the head actuator.

6. The servo pattern writing apparatus according to claim 5, wherein:

when the recording medium is moved by the second mechanism, the controller drives the second mechanism so as to apply a load larger than the load applied from the first mechanism when the recording medium is moved by the first mechanism.

7. The servo pattern writing apparatus according to claim 6, wherein:

each of the first mechanism and second mechanism is provided with plural pins which are respectively brought into direct contact with plural recording media in order to center the plural recording media all at once by moving the plural recording media simultaneously.

8. The servo pattern writing apparatus according to claim 6, wherein:

each of the first mechanism and second mechanism is provided with a sensor capable of measuring the displacement of the pins and the measured displacement is compared with a target displacement of the pins.

9. The servo pattern writing apparatus according to claim 6, wherein:

the controller further includes means for entering or measuring the inner diameter of the recording medium and means for using this inner diameter to determine the amount of movement to be done by the second mechanism.

10. The servo pattern writing apparatus according to claim 7, wherein:

each of the first mechanism and second mechanism is provided with a sensor capable of measuring the displacement of the pins and the measured displacement is compared with a target displacement of the pins.

11. The servo pattern writing apparatus according to claim 10, wherein:

the controller further includes means for entering or measuring the inner diameter of the recording medium and means for using this inner diameter to determine the amount of movement to be done by the second mechanism.

12. The servo pattern writing apparatus according to claim 7, wherein:

the controller further includes means for entering or measuring the inner diameter of the recording medium and means for using this inner diameter to determine the amount of movement to be done by the second mechanism.

13. The servo pattern writing apparatus according to claim 8, wherein:

the controller further includes means for entering or measuring the inner diameter of the recording medium and means for using this inner diameter to determine the amount of movement to be done by the second mechanism.

14. The servo pattern writing apparatus according to claim 5, wherein:

each of the first mechanism and second mechanism is provided with plural pins which are respectively brought into direct contact with plural recording media in order to center the plural recording media all at once by moving the plural recording media simultaneously.

15. The servo pattern writing apparatus according to claim 14, wherein:

each of the first mechanism and second mechanism is provided with a sensor capable of measuring the displacement of the pins and the measured displacement is compared with a target displacement of the pins.

16. The servo pattern writing apparatus according to claim 15, wherein:

the controller further includes means for entering or measuring the inner diameter of the recording medium and means for using this inner diameter to determine the amount of movement to be done by the second mechanism.

17. The servo pattern writing apparatus according to claim 14, wherein:

the controller further includes means for entering or measuring the inner diameter of the recording medium and means for using this inner diameter to determine the amount of movement to be done by the second mechanism.

18. The servo pattern writing apparatus according to claim 5, wherein:

the controller further includes means for entering or measuring the inner diameter of the recording medium and means for using this inner diameter to determine the amount of movement to be done by the second mechanism.

19. The servo pattern writing apparatus according to claim 5, wherein:

the controller comprises a first controller which controls the first mechanism and the second mechanism and a second controller which generates the servo pattern and drives the head actuator mechanism.

* * * * *